United States Patent
Pandel et al.

(10) Patent No.: US 7,039,107 B1
(45) Date of Patent: May 2, 2006

(54) METHOD AND ARRAY FOR PROCESSING A DIGITIZED IMAGE WITH IMAGE POINTS

(75) Inventors: Jürgen Pandel, Feldkirchen-Westerham (DE); Gero Bäse, München (DE); Norbert Oertel, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/786,694

(22) PCT Filed: Sep. 1, 1999

(86) PCT No.: PCT/DE99/02763

§ 371 (c)(1),
(2), (4) Date: Mar. 8, 2001

(87) PCT Pub. No.: WO00/19373

PCT Pub. Date: Apr. 6, 2000

(30) Foreign Application Priority Data

Sep. 29, 1998 (DE) ................................ 198 44 664

(51) Int. Cl.
*H04N 7/12* (2006.01)

(52) U.S. Cl. ................................. 375/240.08

(58) Field of Classification Search ........... 375/240.12, 375/240.08, 240.21, 240.24
See application file for complete search history.

(56) References Cited

U.S. PATENT DOCUMENTS

| | | | |
|---|---|---|---|
| 5,771,102 A | | 6/1998 | Vogt et al. |
| 6,208,693 B1 * | | 3/2001 | Chen et al. ............ 375/240.24 |
| 6,233,356 B1 * | | 5/2001 | Haskell et al. .............. 382/243 |
| 6,272,253 B1 * | | 8/2001 | Bannon et al. ............. 382/236 |
| 6,349,113 B1 * | | 2/2002 | Mech et al. ........... 375/240.08 |
| 6,389,176 B1 * | | 5/2002 | Hsu et al. .................... 382/254 |
| 6,421,384 B1 * | | 7/2002 | Chung et al. .......... 375/240.09 |
| 6,535,558 B1 * | | 3/2003 | Suzuki et al. .......... 375/240.12 |

FOREIGN PATENT DOCUMENTS

| | | |
|---|---|---|
| DE | 196 04 050 | 2/1997 |
| DE | 196 48 963 C1 | 4/1998 |
| EP | 0 540 961 A2 | 5/1993 |
| EP | 0 582 819 A2 | 2/1994 |
| WO | WO 98/15915 | 4/1998 |
| WO | WO 98/29834 | 7/1998 |

OTHER PUBLICATIONS

Moving Object Segmentation Based on Adaptive Reference Images—Signal Processing v. Theories and Applications—Karmann et al—pp. 951-954.
Express Letters—IEEE Transactions On Circuits and Systems For Video Technology, vol. 5, No. 3, Jun. 1995.
IEEE Transactions On Circuits and Systems For Video Technology, vol. 5, No. 1, Feb. 1995—Shape-Adaptive DCT for Generic Coding of Video.
International Telecommunication Union—ITU-T—DRAFT H.263 (May 2, 1996).
International Organisation for Standardisation . . . ,ISO/IEC JTC1/SC29/WG11 N1692 Apr. 11, 1997.

* cited by examiner

*Primary Examiner*—Nhon Diep
(74) *Attorney, Agent, or Firm*—Bell, Boyd & Lloyd LLC

(57) ABSTRACT

In a method and arrangement for processing a digitized picture with pixels, pixels of the picture are grouped into picture blocks. The picture is segmented into at least a first picture object and a second picture object, at least one picture block being assigned at least to a part of an edge of the first picture object. Information about the picture object is assigned to the at least one picture block.

16 Claims, 4 Drawing Sheets

METHOD AND ARRAY FOR PROCESSING A DIGITIZED IMAGE WITH IMAGE POINTS

BACKGROUND OF THE INVENTION

The invention relates to a method and an arrangement for processing a digitized picture with pixels.

Such an arrangement and such a method are disclosed in ITU-T Draft Recommendation H.263, Video Coding for Low Bitrate Communication, September, 1997.

In the arrangement disclosed in Video Coding, supra and in the method disclosed in Video Coding, supra, a digitized picture to be processed has pixels to which coding information is assigned in each case.

Coding information is to be understood hereinafter to mean brightness information (luminance value) and/or chrominance information (color value) assigned to the respective pixel.

The pixels are grouped into picture blocks, each picture block normally having 8*8 or 16*16 pixels.

The picture blocks are furthermore grouped into macroblocks, each macroblock having four picture blocks which contain coding information in the form of brightness information (luminance picture blocks), and two picture blocks which contain chrominance information (chrominance picture blocks).

In the picture coding method which is disclosed in Video Coding, supra and is configured in accordance with the H.263/V.2 standard, provision is made for using so-called difference-picture coding for coding a digitized picture.

It is precisely in the case where such difference-picture coding is used that, in the case of a moving camera which records a scene, or else in the case of a recorded scene which is subjected to changes, the problem arises that the recorded background is not stationary.

This problem area takes on particular significance in the use of such methods for picture coding in the context of a mobile communications device, for example in the case of use in the context of a video mobile phone.

A video mobile phone is to be understood to be an apparatus in which a camera for recording a sequence of pictures and a telephone are integrated in an apparatus, the telephone being a radio telephone.

In the case of customary difference-picture coding, in such a case of a greatly changing background, a high proportion of an available data rate for the communication is required for coding for the greatly changing background. This results in a smaller proportion of the available data rate remaining for an object of interest which can be seen in a foreground of the picture and which only changes slightly compared with the background. Accordingly, the quality of the respectively coded picture is too poor.

However, it is often desirable for an object situated in the foreground to have a good quality, while a poorer quality in the picture coding with low resolution is entirely acceptable for the background.

Video Coding, supra, describes that, in an optional coding mode (slice structured mode), the digitized picture is subdivided into rectangles, the so-called slices, and coding parameters are respectively allocated separately to each rectangle.

The coding parameters specify, inter alia, the quantization with which the object contained in the respective rectangle is to be coded.

This procedure disclosed in Video Coding, supra has the disadvantage that the entire picture has to be decomposed into individual rectangles. This leads to considerable inflexibility in the context of coding a digitized picture. A further disadvantage in the case of the procedure disclosed in Video Coding, supra is to be seen in the fact that only a uniform spatial resolution can be used for all the slices.

ISO/IEC JTC1/SC29/WG11, MPEG-4 Systems, Working Draft 4.0 of ISO/IEC 14496-1, A. Eleftheriadis, C. Herpel, L. Ward (ed.), Apr. 16, 1997 discloses an object-based picture coding method referred to as an MPEG-4 picture coding method. In this method, different objects within the digitized picture are coded separately from one another. The video data streams arising from the coding of the individual picture objects are combined using a multiplexer. The method in accordance with the MPEG-4 standard has the disadvantage, in particular, that, on account of the highly complex method of coding the individual video data streams, in the case of a multiplicity of picture objects to be coded, considerable computing power is required for coding in real time and for automatic generation. This results from the coded quantity of video data streams of a scene description describing the interaction of the individual picture objects within the digitized picture. The requisite computing power is currently not available particularly in the case of mobile communications devices, for example a video mobile phone.

K.-P. Karmann et al, Moving object segmentation based on adaptive reference images, Proceedings of EUSIPCO-90, pp. 951–954, Barcelona, September 1990 discloses a method for segmenting a picture into picture objects, the method being referred to as moving object segmentation.

DE 196 54 983 B discloses reducing block artifacts produced in the context of block-based picture coding by using a block edge filter.

WO 98 15915 A (Univ. Columbia) Apr. 16, 1998 discloses a method for processing a digitized picture with pixels, in which the pixels are grouped into picture blocks, in which the picture is segmented into at least a first picture object and a second picture object. At least one picture block being assigned to at least a part of an edge of the first picture object and in which information about the picture object is assigned to the at least one picture block.

WO 98 15915 A does not disclose that the method is used in a mobile communications device. However, this feature is disclosed in U.S. Pat. No. 5,771,102 (Pelz Rodolfo Mann et al) Jun. 23, 1998, where a method for transmitting pictures between mobile telephones is described.

SUMMARY OF THE INVENTION

It is an object of the invention to specify a method and an arrangement for processing a digitized picture with pixels which have increased flexibility with regard to the coding of a picture and require reduced computing power compared with the known methods.

The problem is solved by means of the method and also by means of the arrangement as described as follows.

A method is provided for processing a digitized picture with pixels and which has the following steps:

a) the pixels are grouped into picture blocks,
b) the picture is segmented into at least a first picture object and a second picture object, at least one picture block being assigned to at least a part of an edge of the first picture object and
c) information about the picture object is assigned to the at least one picture block.

An arrangement for processing a digitized picture with pixels contains a processor which is set up in such a way that
a) the pixels are grouped; into picture blocks,
b) the picture is segmented into at least a first picture object and a second picture object, at least one picture block being assigned to at least a part of an edge of the first picture object and
c) information about the picture object is assigned to the at least one picture block.

The invention achieves a simpler method of coding picture objects which enables a flexible division of the available data rate for coding different picture objects.

Preferably, a plurality of picture blocks are in each case grouped to form a macroblock. A macroblock being assigned at least to the part of the edge.

A further refinement provides for at least one luminance block of the macroblock to be assigned at least to the part of the edge of the first picture object.

Furthermore, at least one picture block is preferably assigned to the entire edge of the first picture object.

Furthermore, a development provides for information about the picture object to be in each case assigned to all the macroblocks in which the edge of the first picture object is contained.

In a further refinement, the first picture object is addressed using a macroblock address respectively assigned to a macroblock.

A further refinement provides for the second picture object to be addressed using a macroblock address respectively assigned to a macroblock.

Preferably, the picture objects are coded with different quality, in which case, preferably, a quality specification indicating the quality with which a picture object is coded is assigned to at least one macroblock contained in the corresponding picture object.

The method and the apparatus can be used for coding a digitized picture or for decoding a digitized picture.

The apparatus and the method are suitable for use in a mobile communications device, for example a video mobile phone.

An exemplary embodiment of the invention is illustrated in the figures and is explained in more detail below.

DESCRIPTION OF THE PREFERRED EMBODIMENT

Figure 1:
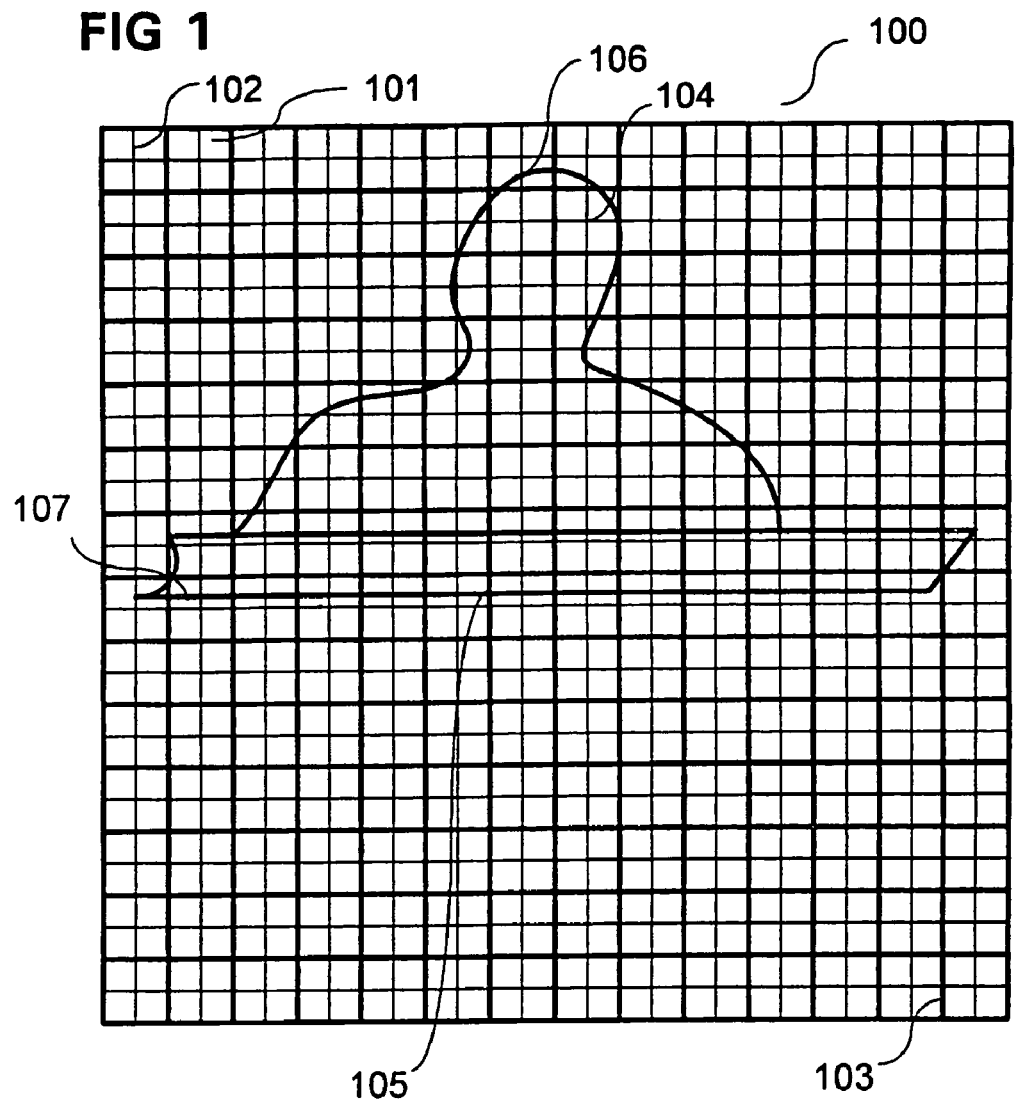
FIG. 1 shows a sketch of a picture which is processed in accordance with the exemplary embodiment.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
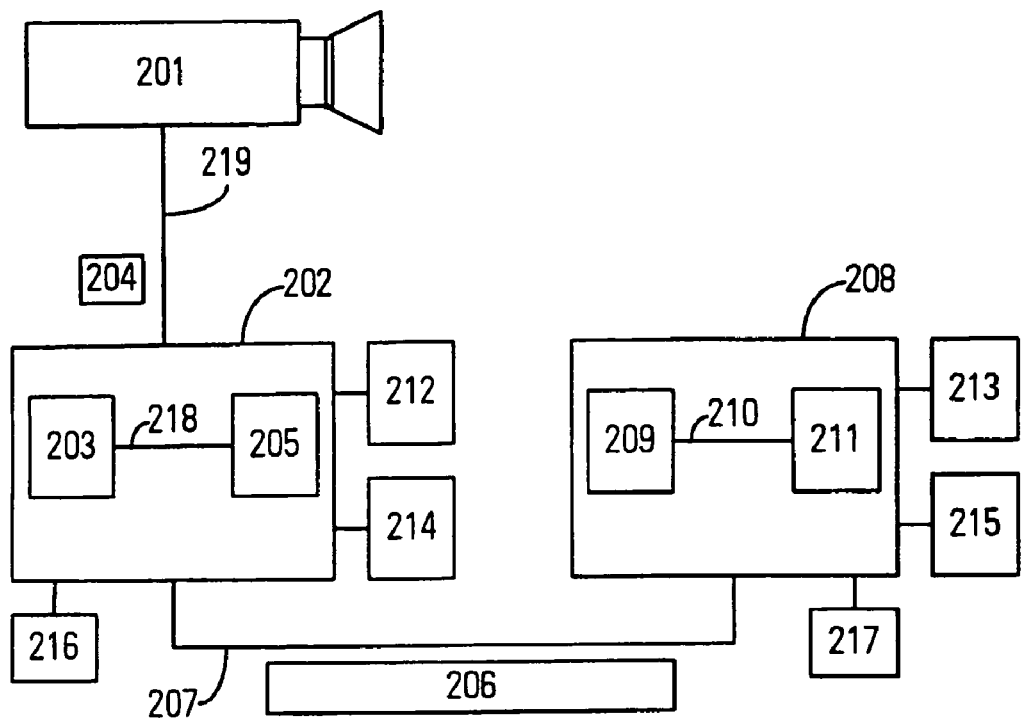
FIG. 2 shows an arrangement of two computers, a camera and a screen, by means of which the picture data are coded, transmitted, decoded and displayed.

FIG. 2 shows an arrangement which comprises two computers 202, 208 and a camera 201, illustrating the picture coding, transmission of picture data and picture decoding.

A camera 201 is connected to a first computer 202 via a line 219. The camera 201 communicates recorded pictures 204 to the first computer 202. The first computer 202 has a first processor 203, which is connected via a bus 218 to a frame store 205. A method for picture coding is carried out using the first processor 203 of the first computer 202. Picture data 206 coded in this way are transmitted from the first computer 202 via a communication link 207, preferably a line or a radio link, to a second computer 208. The second computer 208 contains a second processor 209, which is connected via a bus 210 to a frame store 211. A method for picture decoding is carried out using the second processor 209.

Both the first computer 202 and the second computer 208 have a respective screen 212 and 213, on which the picture data 204 are displayed, with the display on the screen 212 of the first computer 202 normally being only for monitoring purposes. Input units, preferably a keyboard 214 or 215, respectively, and a computer mouse 216 or 217, respectively, are in each case provided to control both the first computer 202 and the second computer 208.

The picture data 204 which are transmitted from the camera 201 via the line 219 to the first computer 202 are data in the time domain, while the data 206 which are transmitted from the first computer 202 to the second computer 208 via the communication link 207 are picture data in the spectral domain.

The decoded picture data are displayed on the screen 213.

Figure 3:
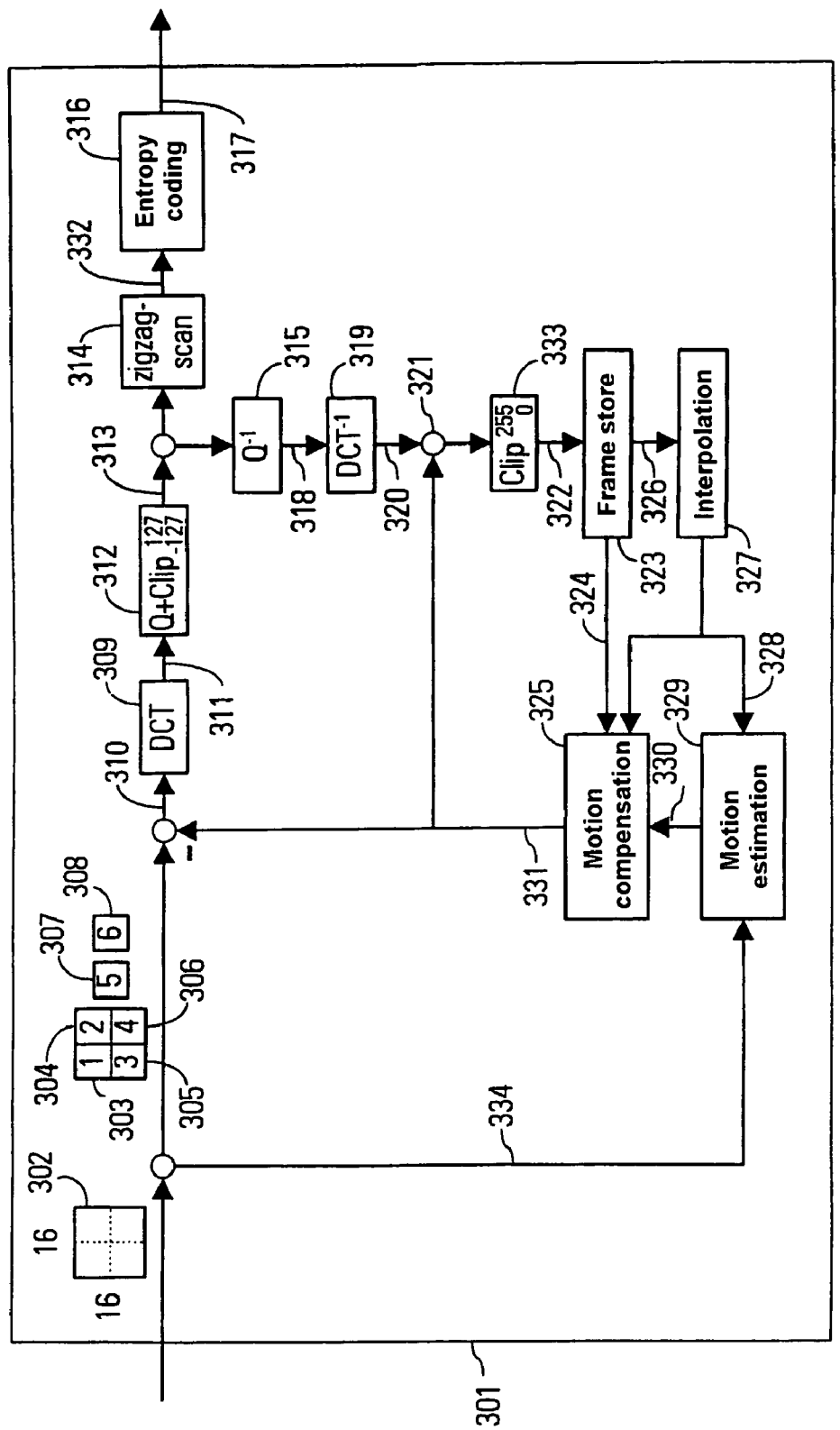
FIG. 3 shows a sketch of an apparatus for block-based coding of a digitized picture.

FIG. 3 shows a sketch of an arrangement for carrying out a block-based picture coding method in accordance with the H.263 Standard (see Video Coding, supra).

A video data stream to be coded with chronologically successive digitized pictures is supplied to a picture coding unit 301. The digitized pictures are subdivided into macroblocks 302, with each macroblock containing 16×16 pixels. The macroblock 302 comprises 4 picture blocks 303, 304, 305 and 306, with each picture block containing 8×8 pixels to which luminance values (brightness values) are assigned. Furthermore, each macroblock 302 comprises two chrominance blocks 307 and 308 with chrominance values (color difference values) allocated to the pixels.

The picture blocks are supplied to a transformation coding unit 309. In the case of difference-picture coding, values to be coded for picture blocks in chronologically preceding pictures are removed from the picture blocks to be coded at that time, and only the difference-forming information 310 is supplied to the transformation coding unit (discrete cosine transformation DCT) 309. For this purpose, the current macroblock 302 is reported via a link 334 to a motion estimation unit 329. Spectral coefficients 311 are formed in the transformation coding unit 309 for the picture blocks and difference picture blocks to be coded, and are supplied to a quantization unit 312.

Quantized spectral coefficients 313 are supplied in a backward path both to a scanning unit 314 and to an inverse quantization unit 315. After a scanning method, for example a zigzag scanning method, entropy coding is carried out on the scanned spectral coefficients 332, in an entropy coding unit 316 provided for this purpose. The entropy-coded spectral coefficients are transmitted to a decoder as coded picture data 317 via a channel, preferably a line or a radio link.

An inverse quantization of the quantized spectral coefficients 313 is carried out in the inverse quantization unit 315. Spectral coefficients 318 obtained in this way are supplied to an inverse transformation coding unit 319 (inverse discrete cosine transformation IDCT). Reconstructed coding values (also difference coding values) 320 are supplied in the difference picture mode to an adder 321. The adder 321 furthermore receives coding values for a picture block, which result from a chronologically preceding picture once motion compensation has already been carried out. The adder 321 is used to form reconstructed picture blocks 322, which are stored in a frame store 323.

Chrominance values 324 for the reconstructed picture blocks 322 are supplied from the frame store 323 to a motion compensation unit 325. For brightness values 326, interpolation is carried out in an interpolation unit 327 provided for this purpose. The interpolation is preferably used to quadruple the number of brightness values contained in the respective picture block. All the brightness values 328 are supplied both to the motion compensation unit 325 and to the motion estimation unit 329. The motion estimation unit 329 also receives the picture blocks of the respective macroblock (16×16 pixels) to be coded, via the link 334. The motion estimation is carried out in the motion estimation unit 329, taking account of the interpolated brightness values ("motion estimation on a half-pixel basis").

The result of the motion estimation is a motion vector 330 which expresses a local displacement of the selected macroblock from the chronologically preceding picture to the macroblock 302 to be coded.

Both brightness information and chrominance information related to the macroblock determined by the motion estimation unit 329 are shifted through the motion vector 330 and are subtracted from the coding values of the macroblock 302 (see the data path 331).

The motion estimation thus results in the motion vector 330 with two motion vector components, a first motion vector component $BV_x$ and a second motion vector component $BV_y$ along the first direction x and the second direction y:

$$BV = \begin{pmatrix} BV_x \\ BV_y \end{pmatrix}.$$

The motion vector 330 is assigned to the picture block.

The picture coding unit shown in FIG. 3 thus supplies a motion vector 330 for all the picture blocks and macro picture blocks.

FIG. 1 shows a picture 100 recorded by the camera 201 and having pixels, the pixels being grouped into picture blocks 101. 8×8 pixels are in each case grouped to form a picture block 101.

Luminance information is assigned to the pixels. Four luminance picture blocks 101 are grouped to form a macroblock 102.

FIG. 1 shows a first picture object 104, which describes a person, a second picture object 105, which describes a table surface, and a third object 103, which describes a picture background.

The first picture object 104 and the second picture object 105 together form a picture foreground.

Figure 4:
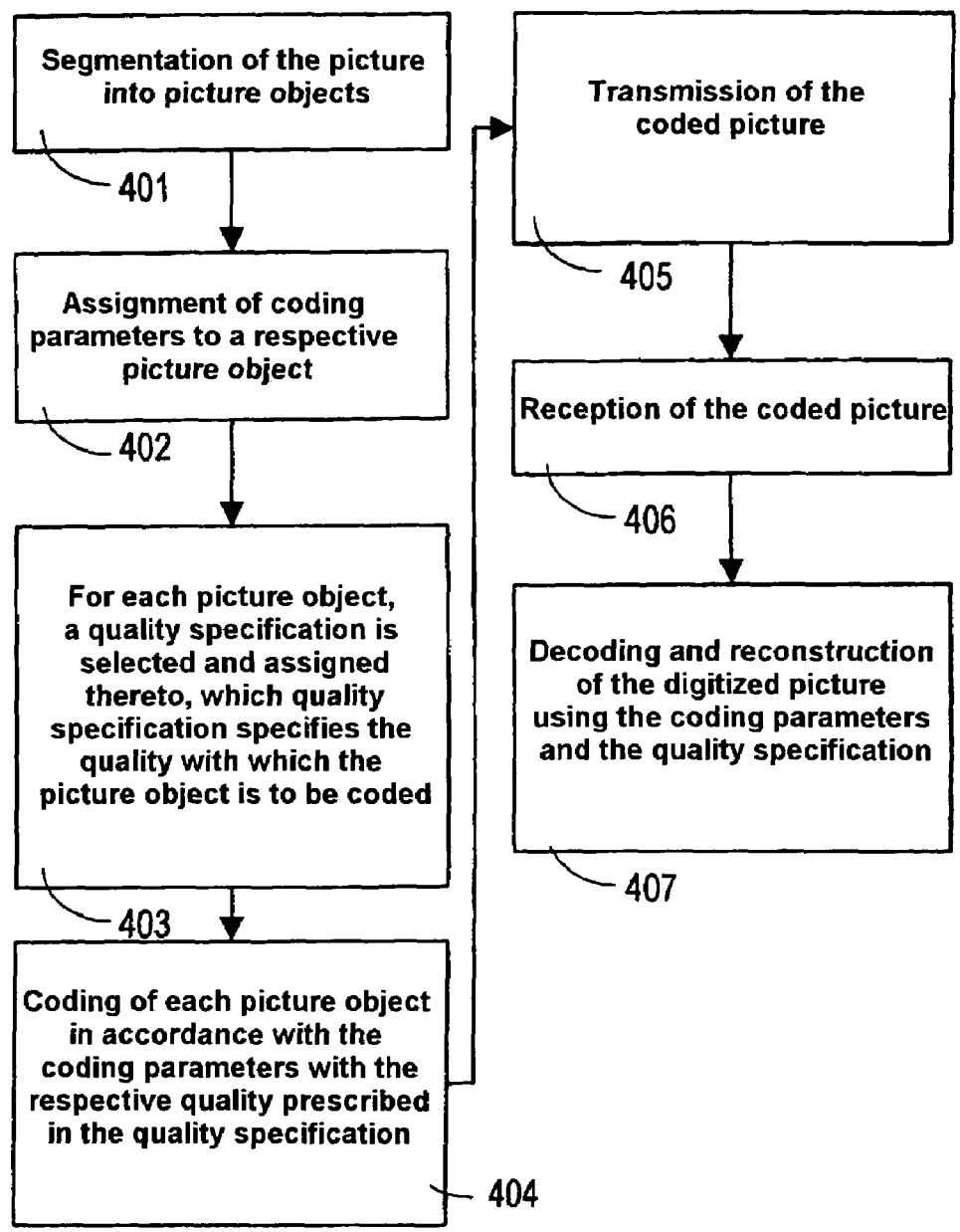
FIG. 4 shows a flow diagram illustrating the method steps for coding, transmission and decoding of a digitized picture.

In a first step (step 401, cf. FIG. 4), the picture is segmented into a plurality of picture objects. The picture is segmented in accordance with the method described in Karmann et al, supra, this method being referred to as moving object segmentation. The segmentation is effected in such a way that an edge 106, 107 of the first picture object 104 and of the second picture object 105, respectively, in each case correspond to a block boundary of a macroblock or at least to the block boundaries of the luminance picture blocks in a macroblock.

In a second step (step 402), a set of coding parameters is in each case assigned to each picture object 103, 104, 105.

The coding parameters specify, inter alia, the spatial resolution to be used for coding the respective picture object, motion vectors, coding type (intra-frame coding or inter-frame coding), quantization, etc.

Furthermore, for each picture object 103, 104, 105, in a further step (step 403), a quality specification is selected and assigned to the respective picture object 103, 104, 105 as a coding parameter. The quality specification specifies the quality with which the picture object is to be coded in each case.

In this example, the quality specification is given by the specification of the quantization to be chosen.

The coding parameters are stored in a picture object header field (object header) assigned to the respective picture object 103, 104, 105, coded and transmitted together with the remaining picture information to be coded, the picture blocks and/or the difference picture information.

In accordance with the above-described method illustrated in FIG. 3, in a further step (step 404), each picture object 103, 104, 105 is coded in accordance with the coding parameters with the respective quality prescribed in the quality specification.

In this case, a foreground object, i.e. the first picture object 104 or else the second picture object 105, is coded with a better picture quality, i.e. more data rate is available for the coding of the first picture object 104 and of the second picture object 105 than for the coding of the background picture object, the third picture object 103.

It should be noted that it is not necessary for the individual picture objects to be disjoint, but the set union of all pixels of the first picture object 104, of the second picture object 105 and of the third picture object 103 contains all pixels of the picture 100.

For the coding of the picture 100, a picture header field is provided in each case for the entire picture, various coding parameters which are identical for the coding of the entire picture being specified in said picture header field.

Thus, a segmentation specification describing the way in which the picture 100 is segmented into picture objects 103, 104, 105 is specified in the picture header field.

For the coding of the segmentation specification, two bits are provided in the picture header field. Four different types of segmentation are distinguished:

First segmentation type (code 00):
    The method described is not used for coding the picture 100.

Second segmentation type (code 01):
    All picture objects including the background picture objects are disjoint and exactly fill the predetermined picture format of the picture 100.

Third segmentation type (code 10):
    The picture objects are allowed to overlap and are also allowed to lie outside a customary picture frame. However, it lies within a predetermined frame which is larger than the customary picture frame and must not be exceeded.

Fourth segmentation type (code 11):
    With the exception of the background picture object, all picture objects are disjoint. The fourth segmentation type serves for efficient coding of the background information, since already coded background can be stored in a memory, the background memory. Picture background exposed again by a moving picture object does not have to be newly coded again. The background is allowed to project beyond the predetermined picture frame of the picture 100 in order that, in the event of a movement of the camera 201 recording the picture 100, recourse can be had to already coded information. Once again, a prescribed frame is determined which is larger than the customary picture frame of the picture 100. This prescribed frame must not be exceeded.

In a further step (step 405), the coded information of the picture is transmitted as a coded picture from the first computer 202 to the second computer 208.

In a further step (step 406), the coded picture is received by the second computer 208.

In a last step (step 407), the received coded picture information is decoded and the digitized picture is reconstructed using the concomitantly transmitted coding parameters and the quality specification.

Different types of picture objects may occur, a respective type of a picture object being coded by a code in the header field of the respective picture object.

A first type of picture object is a rectangular picture object having a width w and a height h. On account of the correspondence of the object boundaries (edge of the picture object) to the edges of the respective macroblocks, the rectangular object is addressed by the absolute macroblock address of the top left macroblock in the rectangular picture object.

The macroblock address is an address which is assigned to the respective macroblock and uniquely identifies each macroblock in the context of picture coding.

The width w of the rectangular picture object is coded using variable length coding.

The macroblocks are addressed in such a way that in the picture 100, line by line from left to right, a respective value of which represents the macroblock address, is incremented from macroblock to macroblock. For the coding of a respective picture object, a picture object start code is provided which specifies that the further data relate to coding of a picture object. Consequently, the coding of the last macroblock of a picture object is in each case followed by either a new picture object start code or a new picture start code which specifies that data of a new picture are subsequently coded.

If the boundaries of the rectangular picture object do not correspond to the macroblock raster, but do correspond to the block boundaries of the luminance picture blocks, then the relative position of the respective luminance picture blocks with respect to the macroblock boundaries is coded by additional bits in the picture object header field.

Picture objects which do not have a rectangular structure are segmented in such a way that the edge of the respective picture object corresponds to the block boundaries of the macroblocks or at least to the block boundaries of the luminance picture blocks.

In this case, the first macroblock of the picture object is addressed by the absolute macroblock address in accordance with the addressing scheme described above.

The subsequent macroblocks belonging to the respective picture object are addressed using run length coding, as is known from the method in accordance with the H.261 standard.

The coding of the last macroblock in the picture object is likewise followed by either a new picture object start code or a new picture start code.

A third type of picture object is a background picture object; in the present case, the third picture object 103 represents a background picture object. A background picture object describes a background, the information represented in the background having less significance to the observer than the information described in a foreground picture object.

In contrast to the slice structured mode disclosed in Video Coding, supra, the background picture object is not necessarily rectangular even in the case of a rectangular picture object, the rectangular object.

For the coding of a background picture object, the process begins with a picture object start code. The addressing of the macroblocks of the background picture object depends on the selected segmentation type described above.

In the case of the second segmentation type (code 01), the position of all the background macroblocks, i.e. all the macroblocks which are contained in the background picture object, is unambiguously determined after the coding of the last picture object, and they can be successively addressed in the manner described above in accordance with the addressing of the macroblocks. Macroblocks which do not belong to the picture background need not be skipped by run length coding.

In the case of the second segmentation type and also in the case of the third segmentation type (code 10 and code 11) the addressing is effected as in the case of the picture objects having a non-rectangular structure.

A number of alternatives to the exemplary embodiment described above are explained below.

As an alternative to the variable length coding, fixed length coding can be used for coding the width w of the rectangular picture object.

Differential coding from the size and the position of the rectangular picture object in a predecessor picture of the picture 100 can also be used in the context of the method.

An alternative to run length coding in the coding of macroblocks of a picture object which does not have a rectangular structure is so-called shape coding, as is described in Eleftheriadis, et al. Differential coding from the position of the picture object in the predecessor picture can also be used for coding the macroblocks.

In the context of this method described above, provision may furthermore be made for using only rectangular picture objects. This leads to a simplification in the coding since, in this case, it is only necessary to increment the macroblock address by w macroblocks when skipping macroblocks which belong to a rectangular picture object. This results in a reduction of required computation operations in the context of coding.

Those picture objects which are of particular interest to an observer of the picture 100 are coded with a higher quality than the picture objects, in particular the background picture objects, which are of less interest to the observer of the picture 100.

Since a block-based picture coding method is used, so-called block artifacts, i.e. visible block edges, occur to an increased extent in the picture areas coded with a lower quality.

In an alternative embodiment, the artifacts are reduced by using a block edge filter. Such a block edge filtering is disclosed in DE 196 54 983 B. The block edge filtering can be used both in the context of decoding and in the feedback loop of the coder, as is illustrated in FIG. 3, as so-called "filter in the loop".

The block edge filtering is preferably used only for the picture objects which are coded with a coarse quantization, i.e. with a low quality.

In the event of a high degree of movement within a sequence of pictures, however, it can happen, even in the case of the picture objects which are coded with increased quality, that a relatively coarse quantization has to be used for a short time on account of the limited data rate. In this case, block edge filtering is temporarily used for this time period of increased motion, which is optionally determined by assessment of the motion vectors determined for the picture objects.

The filter parameters of the filters used for block edge filtering can be dynamically adapted to the respective picture to be coded in accordance with the method disclosed in DE 196 54 983 B.

Furthermore, transmission error protection may be provided for the transmission of the coded pictures, for example a CRC code (Cyclic Redundancy Check) or else a so-called punctured code. In this case, preferably those picture objects which are coded with an increased quality are protected against transmission errors by an error protection mechanism which is "more powerful" than the error protection mechanism used for picture objects which were coded with a lower quality.

The term "more powerful" is to be understood to the effect that an increased number of transmission errors can be detected and corrected by the respective error protection method.

In a variation of the invention, the quality specification may also be given by the specification of a spatial resolution to be chosen. For this case, the foreground object, i.e. the first picture object 104 or else the second picture object 105, is coded with a better picture quality, i.e. with a higher spatial resolution, than the background picture object, the third picture object 103.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

We claim:

1. A method for processing a digitized picture with pixels, comprising the steps of:
   grouping the pixels into picture blocks;
   segmenting the picture into at least a first picture object and a second picture object, at least one picture block being assigned to at least a part of an edge of the first picture object;
   assigning information about the picture object to the at least one picture block;
   coding the picture objects with different quality;
   assigning a quality specification indicating the quality with which a picture object is coded to at least one macroblock contained in the corresponding picture object; and
   determining the quality by a spatial resolution.

2. The method of claim 1 wherein a plurality of picture blocks are in each case grouped to form a macroblock; and
   a macroblock is assigned at least to the part of the edge.

3. The method of claim 2 wherein at least one luminance block of the macroblock is assigned at least to the part of the edge of the first picture object.

4. The method of claim 1 in which at least one picture block is assigned to an entire edge of the first picture object.

5. The method of claim 2 in which information about the picture object is in each case assigned to all the macroblocks in which the edge is contained.

6. The method of claim 2 in which the first picture object is addressed using a macroblock address respectively assigned to a macroblock.

7. The method of claim 2 in which the second picture object is addressed using a macroblock address respectively assigned to a macroblock.

8. The method of claim 1 used for coding a digitized picture.

9. The method of claim 1 used for decoding a digitized picture.

10. The method of claim 1 used in a mobile communications device.

11. An arrangement for processing a digitized picture with pixels, comprising:
    a processor set up in such a way that the pixels are grouped into picture blocks, the picture is segmented into at least a first picture object and a second picture object, at least one picture block being assigned to at least a part of an edge of the first picture object, and information about the picture object is assigned to the at least one picture block;
    means for coding the picture objects with different quality;
    means for assigning a quality specification indicating the quality with which a picture object is coded to at least one macroblock contained in the corresponding picture object; and
    means for determining the quality by a spatial resolution.

12. The arrangement of claim 11 in which the processor is set up in such a way that a plurality of picture blocks are in each case grouped to form a macroblock; and
    a macroblock is assigned at least to the part of the edge.

13. The arrangement of claim 11 used for coding a digitized picture.

14. The arrangement as claimed in claim 11 used for decoding a digitized picture.

15. The arrangement of claim 11 used in mobile communications device.

16. A method for processing a digitized picture with pixels, comprising the steps of:
    grouping the pixels of said digitized picture into picture blocks;
    segmenting the picture into a plurality of picture objects, at least one picture block corresponding to at least a part of an edge of a first picture object;
    assigning information about a picture object to a corresponding picture block;
    coding the picture objects wherein at least two of the picture objects are coded under a different quality;
    assigning a quality specification indicating the quality with which a picture object is coded to at least one macroblock contained in the corresponding picture object; and
    determining the quality by a spatial resolution.

* * * * *